United States Patent [19]

Kleynjans et al.

[11] Patent Number: 4,964,777
[45] Date of Patent: Oct. 23, 1990

[54] TRUCK RESTRAINING DEVICE

[75] Inventors: Joseph P. H. Kleynjans; Walenty Kalempa, both of Coraopolis, Pa.

[73] Assignee: Eriks Holding N.V., Netherlands

[21] Appl. No.: 180,360

[22] Filed: Apr. 11, 1988

[51] Int. Cl.⁵ ............................................. B65G 67/02
[52] U.S. Cl. .................................... 414/401; 414/396; 414/584
[58] Field of Search ............... 414/400, 401, 402, 396, 414/584; 14/71.1, 69.5

[56] References Cited

U.S. PATENT DOCUMENTS

| | | | |
|---|---|---|---|
| 4,400,127 | 8/1983 | Metz | 414/401 |
| 4,488,325 | 12/1984 | Bennett et al. | 414/401 X |
| 4,674,941 | 6/1987 | Hageman | 414/401 |
| 4,692,755 | 9/1987 | Hahn | 414/401 X |
| 4,695,216 | 9/1987 | Erlandsson | 414/401 |
| 4,759,678 | 7/1988 | Hageman | 414/401 |

OTHER PUBLICATIONS

Bear Claw-Beacon Machinery, Inc. (1 p.).
Serco Automatic Vehicle Restraint (1 p.).
TRD-2000 Truck Restraint Device-McGuire (1 p.).
Blue Giant Model TL-85 Truck Latch-Blue Giant Equipment Corp. (1 p.).
Poweramp Power Hook Hydraulic ICC Bumper and Loading Dock Interface-Systems Inc. (1 p.).
Kelley Pneumatic Truck Restraining Device-Kelley Company, Inc. (1 p.).
RITE-HITE DOK-LOK-Rite-Hite Corp. (2 pp.).

Primary Examiner—Frank E. Werner
Attorney, Agent, or Firm—Joseph P. Gastel

[57] ABSTRACT

A restaining device for engaging an ICC bar on a truck including a base, a pivotal deck mounted on the base, a first hydraulic motor for raising the deck into engagement with the ICC bar, a hydraulic circuit responsive to an increase in hydraulic pressure in the first hydraulic motor for actuating a second hydraulic motor mounted on the deck to cause a pair of hands to engage the ICC bar and apply a force biasing it and the truck on which it is mounted toward a building wall.

12 Claims, 6 Drawing Sheets

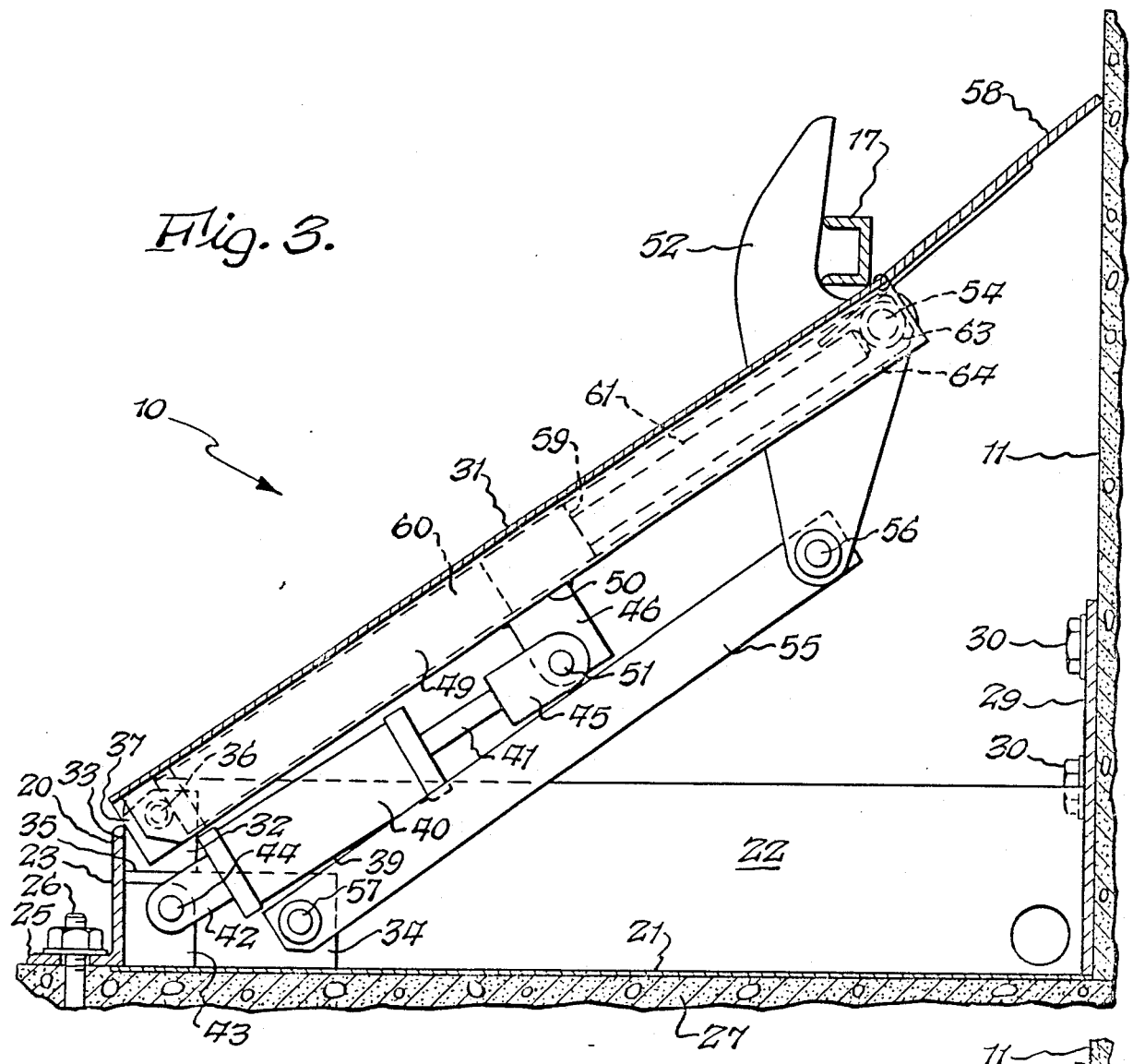
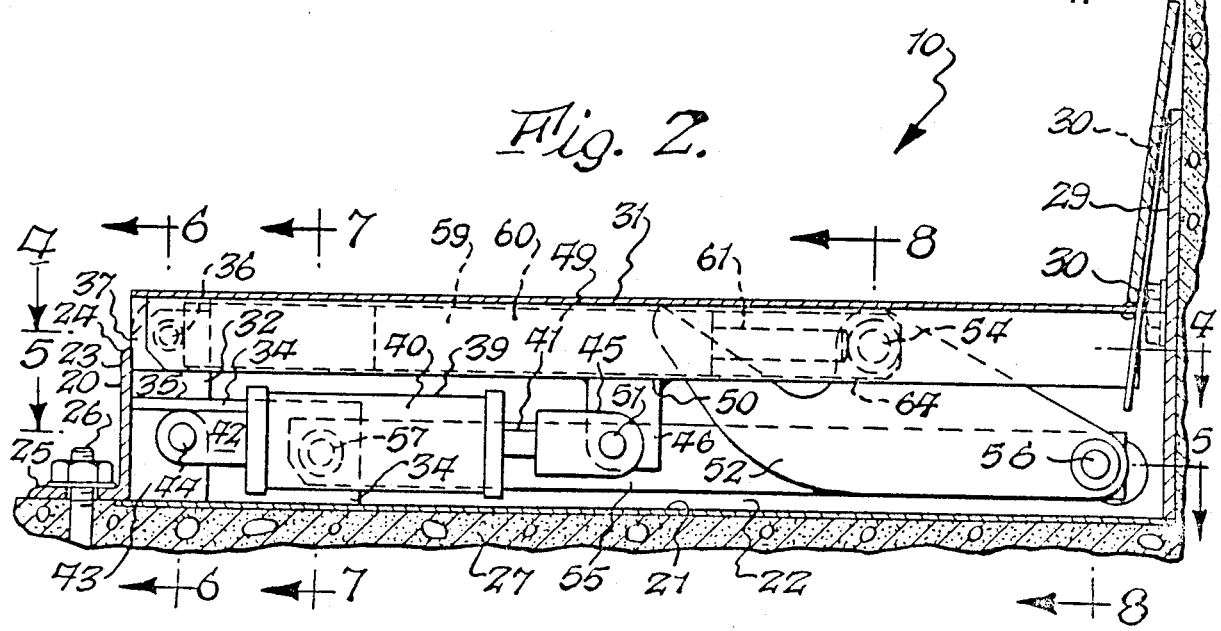

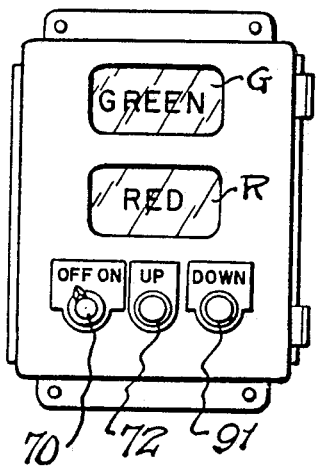
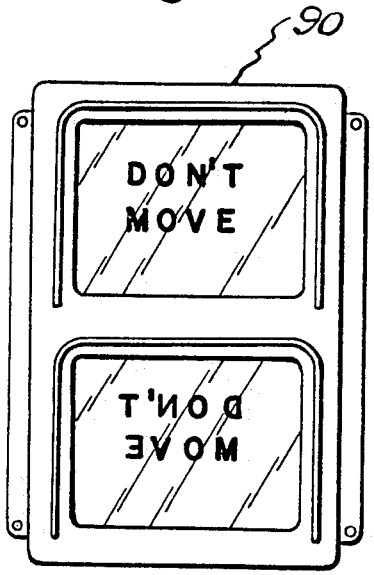
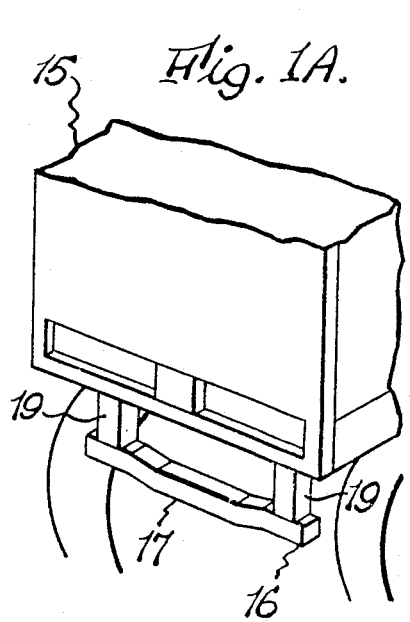
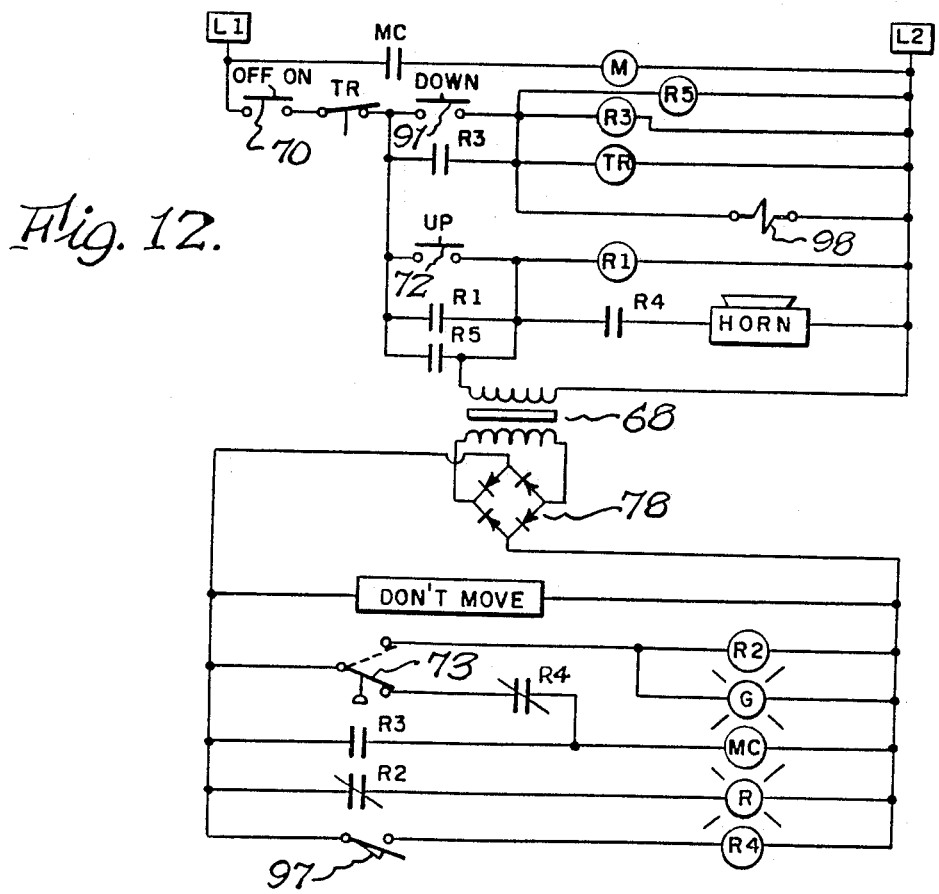

TRUCK RESTRAINING DEVICE

BACKGROUND OF THE INVENTION

The present invention relates to an ICC bar restraining device.

By way of background, when a truck backs up to a loading dock doorway, it is necessary to restrain it against unintentional movement away from the doorway to prevent accidents which may occur both from truck movement and from the creation of a space between the rear end of the truck and the building. To accomplish this, a truck has an ICC bar mounted on its rear portion which projects downwardly below the truck bed. ICC bar restraining devices are usually fastened to the building wall below the doorway to engage the ICC bar and thus restrain the truck from unintentional movement away from the doorway.

There is no standardization of the distance the ICC bars must be above the ground and inwardly from the rear edge of the truck bed. Thus, insoafar as known, prior ICC bar restaining devices were deficient in that they could not latch onto the ICC bars to positively prevent the truck from creeping away from the building wall. In this respect, certain prior ICC bars merely elevated a hook solely in a vertical direction. Such devices therefore had to be spaced sufficiently far from the wall to insure engagement with ICC bars which were at a furthest possible distance from the wall. This oftentimes left a gap between the ICC bar and the latching device so that the truck could move away from the wall before being positively engaged. Other prior devices operated by pivoting a hook or latching member about a fixed axis. These devices were deficient in that they did not extend outwardly a sufficient distance from a building wall to positively engage an ICC bar which was located a relatively great distance from the rear end of a truck or which was too low to be engaged. Furthermore, this type of device would not provide positive engagement with an ICC bar which was located too close to the rear end of the truck and thus a truck could creep away from the wall before it engaged the ICC bar. In short, insofar as known, prior ICC bar restraining devices were not capable of providing positive engagement with ICC bars which were spaced different distances from the ground and different distances from the rear end of a truck.

SUMMARY OF THE INVENTION

It is accordingly the primary object of the present invention to provide an ICC bar restraining device which is capable of the wide latitude of operation to positively engage ICC bars which are located at both different distances from the rear end of a truck and different distances above the ground to thereby firmly lock a truck against a building wall.

It is another object of the present invention to provide an improved ICC bar restaining device which operates in an unique manner to both search out the height of an ICC bar and thereafter apply a force thereto biasing it toward a building wall to thereby avoid unintentional creep of a truck away from the building wall.

Another object of the present invention is to provide an improved ICC bar restaining device which is anchored to the ground in such a manner so that pulling forces applied to the ICC bar by a truck will be opposed by the ground, thereby practically eliminating destructive forces which could otherwise be applied to the building wall.

A further object of the present invention is to provide an improved ICC bar restraining device which is operated by an unique electrohydraulic control system which effectuates the above-desired wide latitude of operation in an extremely unique manner. Other objects and attendant advantages of the present invention will readily be perceived hereafter.

The present invention relates to a restraint device for restraining a vehicle having an ICC bar relative to a wall comprising a base, a raisable member, securing means movably securing said raisable member to said base, hand means mounted on said raisable member for movement therewith for engaging said ICC bar, and motor means for raising said raisable member into a raised position and for causing said hand means to engage said ICC bar with a biasing force toward said wall after said raisable member has been raised to said raised position.

The various aspects of the present invention will be more fully understood when the following portions of the specification are read in conjunction with the accompanying drawings wherein:

BRIEF DESCRIPTION OF THE DRAWINGS

FIG. 1A is a fragmentary perspective view of the rear end of a truck with an ICC bar mounted thereon:

FIG. 2 is a fragmentary cross sectional view taken substantially along line 2—2 of FIG. 1 with the ICC bar restraining device in its lowermost position;

FIG. 3 is a fragmentary cross sectional view similar to FIG. 2 but showing the ICC bar restraining device in an operative position in engagement with an ICC bar;

FIG. 10 is a front elevational view of the control panel for the ICC bar restraining device;

FIG. 11 is a front elevational view of the DON'T MOVE sign used with the restraining device;

FIG. 12 is a schematic electrical wiring diagram for the ICC bar restraining device;

DESCRIPTION OF THE PREFERRED EMBODIMENTS

Figure 1:
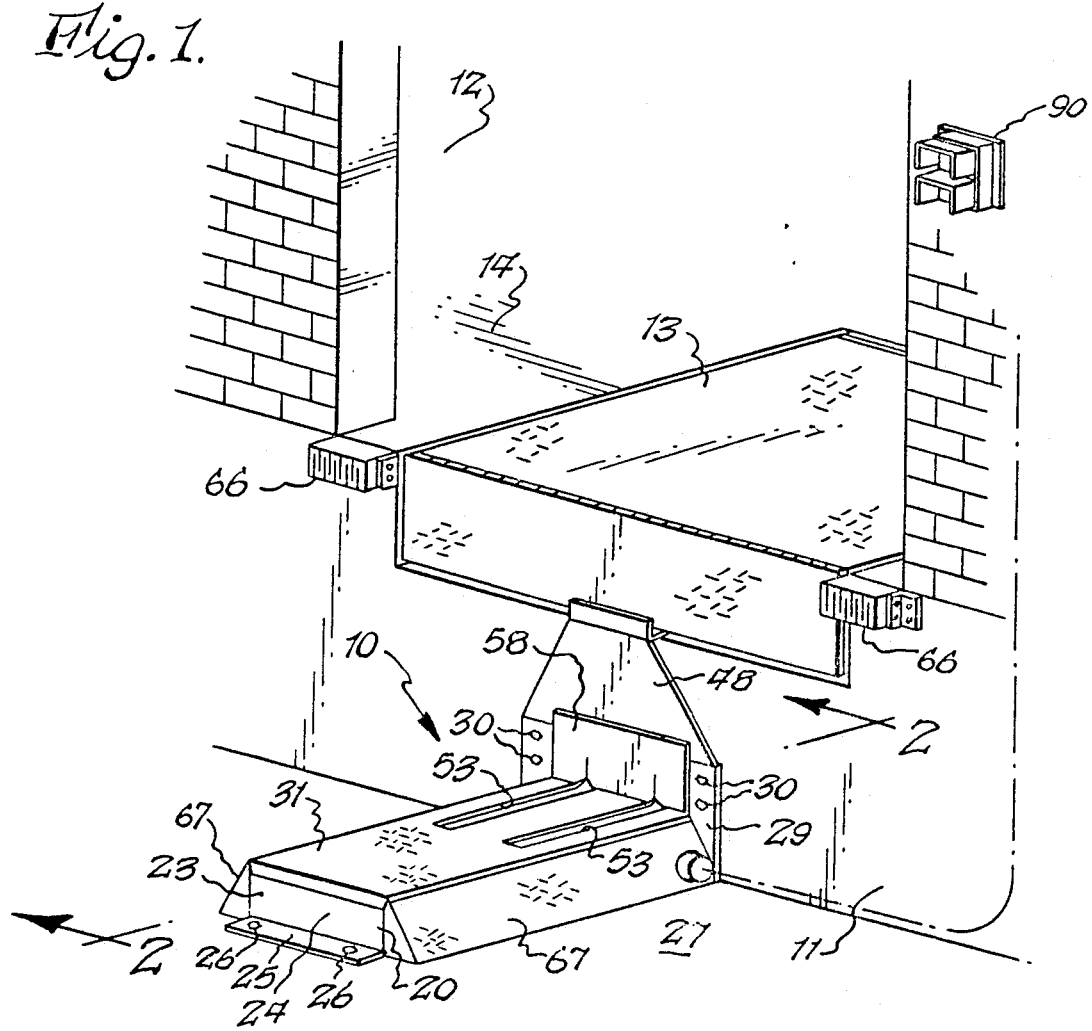
FIG. 1 is a perspective view of the improved ICC bar restraining device mounted on the ground proximate the wall below a doorway in a building wall through which a truck is loaded and unloaded.

The improved ICC bar restraining device 10 of FIGS 1-12 is shown in FIG. 1 mounted below door opening 12 in building wall 11. A dock leveler 13 may be suitably mounted relative to building floor 14 for providing a ramp between floor 14 and a floor of a truck which has its open back located in facing relationship to door opening 12.

As can be seen from FIG. 1A, the rear end of a truck 15 is shown having an ICC bar 16 suitably secured to the frame thereof. The ICC bar includes a lower horizontal bar 17 which may be tubular or in the form of a channel. Bar 17 is secured to the vehicle frame by a pair of struts 19. The function of the ICC bar 16 is to secure the rear end of the truck 15 relative to wall 11 during loading and unloading to prevent the truck from moving away from the wall. This prevents the formation of a space therebetween into which a person or lift truck may fall.

In the past there have been problems in firmly securing the rear end of a truck relative to the wall. These problems arose because the horizontal bar 17 of the ICC bar was not standardized both (1) at a given height above the ground and (2) at a given distance from the rear edge of the truck floor. Prior restraining devices could not both search out the height of the ICC bar and also move laterally toward the building wall to thereby hold the truck firmly against the building wall. The improved restraining device 10 is capable of both searching out the height of an ICC bar and thereafter moving a pair of hands toward the wall to thereby engage the ICC bar and bias it toward the wall regardless of its distance from the wall.

The improved ICC bar restaining device 10 includes a base 20 which comprises a floor plate 21 to which the lower edges of side plates 22 are firmly secured, as by welding. Suitably secured, as by welding, to side plates 22 is the vertical leg 23 of angle 24 which also has a horizontal leg 25 which is secured, as by welding, to floor plate 21. A plurality of bolts 26 secure angle 24 to the concrete roadway 27. A rear plate 29 has its lower portion secured to the edges of side plate 22, as by welding, and has its lower edge secured to floor plate 21, as by welding. A plurality of bolts 30 extend through plate 29 to firmly secure it relative to building wall 11. Thus, the base 20 is firmly secured to both the roadway 27 and building wall 11.

In order to search out the height of a particular ICC bar 17, a raisable member 31 in the form of a deck or platform is pivotally mounted on base 20. More specifically, a pair of tabs 32 (FIGS. 2 and 6) have their vertical edges welded to vertical angle leg 23 at 33 (FIG. 4) and have their lower edges welded to plates 34 at 35 (FIG. 2). Plates 34, in turn, have their lower edges welded to floor plate 21 and they each have a vertical side edge welded to vertical angle leg 23. A pivot shaft 36 (FIG. 6) extends through and is suitably secured relative to tabs 32 and ears 37, which have their upper edges welded to the undersides of deck 31. A spacer tube 62 (FIG. 4) is located between tabs 32. It is by this structure that raisable member or deck 31 is pivotally mounted on base 20.

Figure 8:
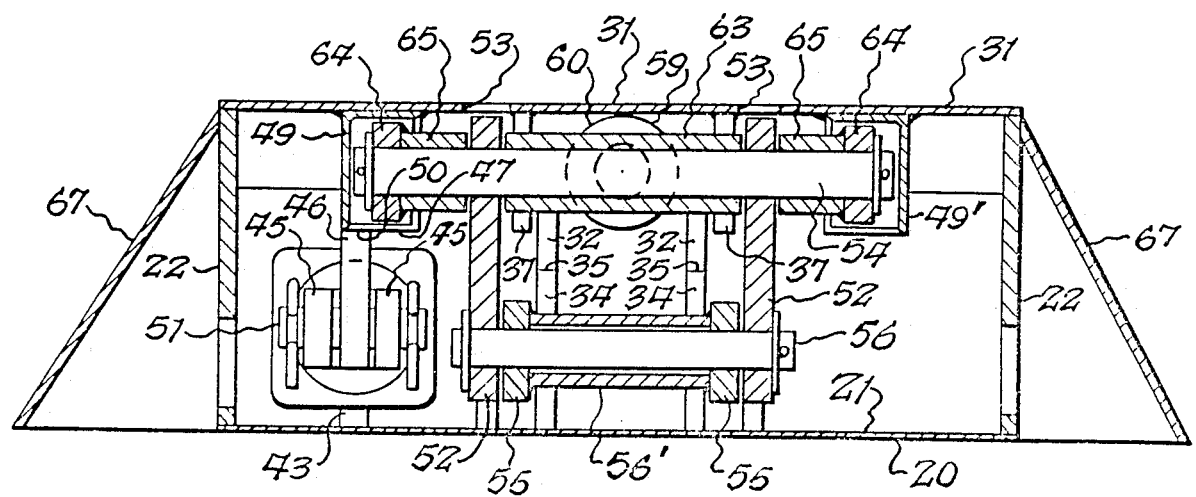
FIG. 8 is a cross sectional view taken substantially along line 8—8 of FIG. 2.
Figure 4:
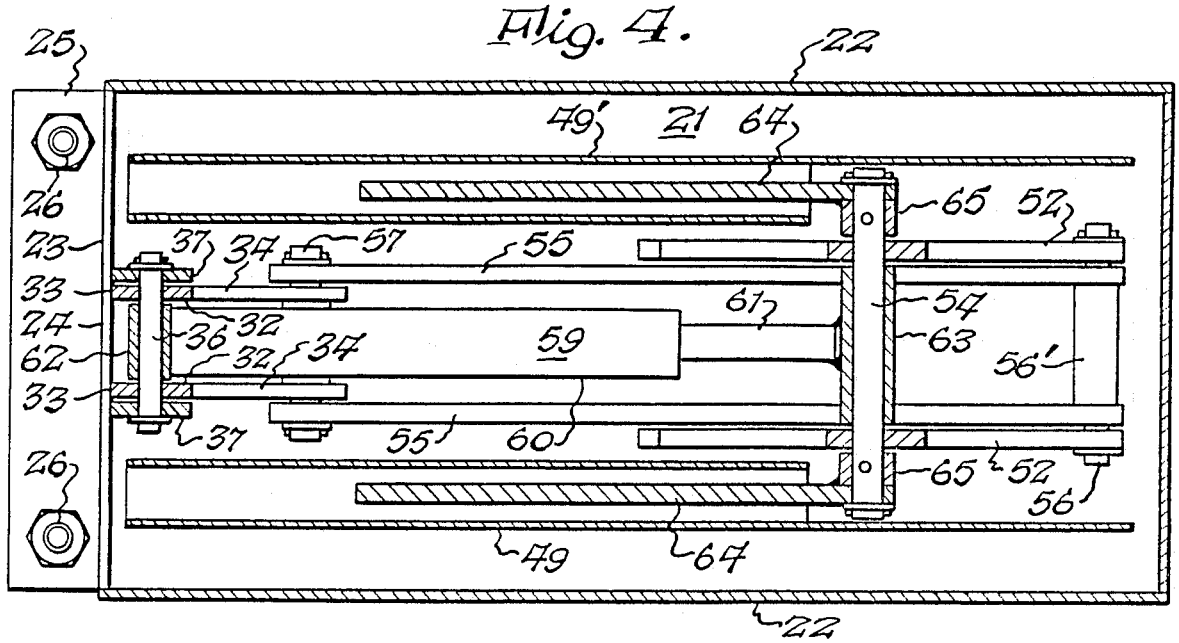
FIG. 4 is a cross sectional view taken substantially along line 4—4 of FIG. 2.
Figure 5:
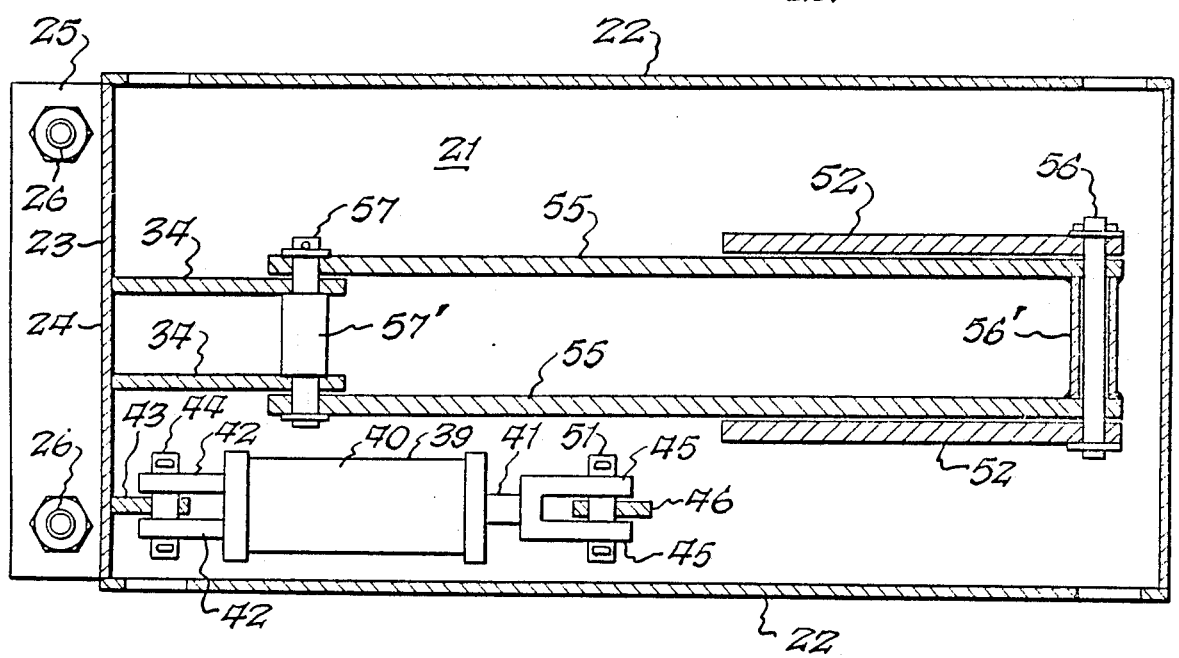
FIG. 5 is a cross sectional view taken substantially along line 5—5 of FIG. 2.
Figure 6:
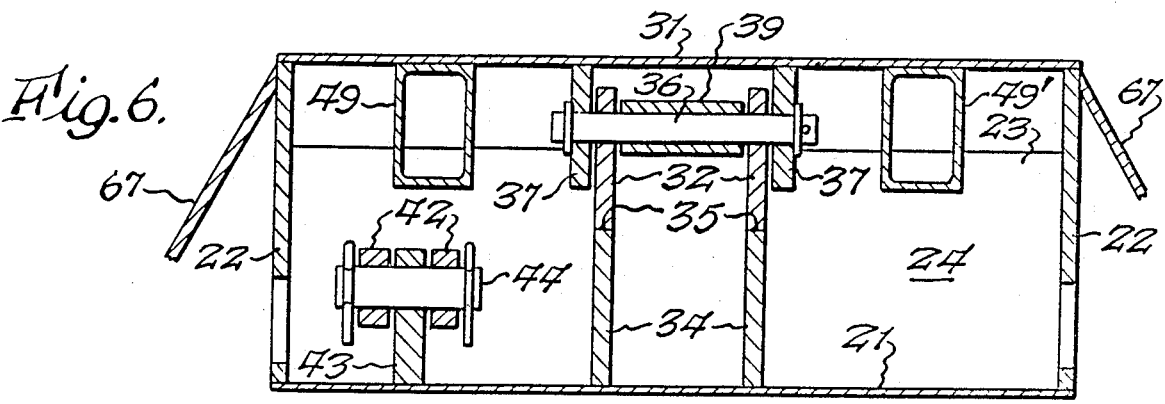
FIG. 6 is a fragmentary cross sectional view taken substantially along line 6—6 of FIG. 2.
Figure 7:
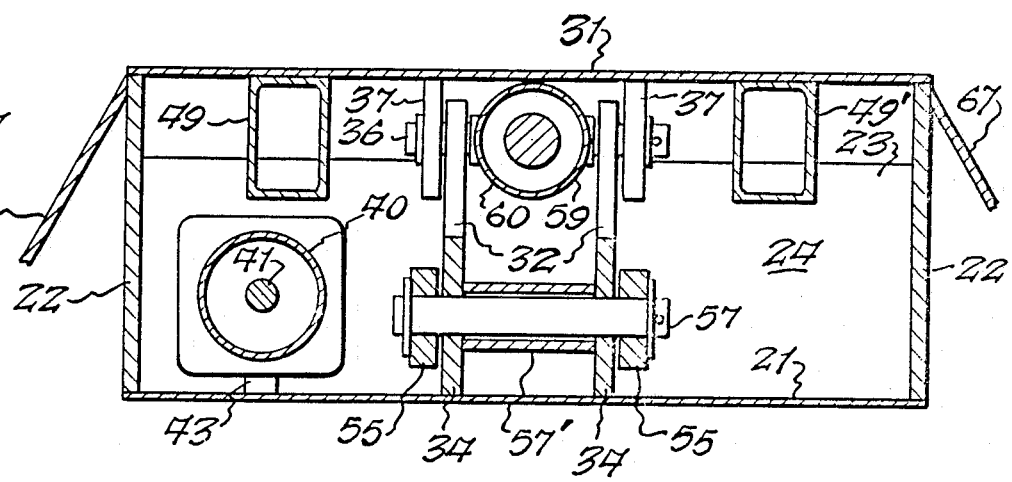
FIG. 7 is a fragmentary cross sectional view taken substantially along line 7—7 of FIG. 2.

In order to pivot deck 31 about shaft 36, a hydraulic motor 39 is provided which consists of a cylinder 40 and a piston 41. The cylinder 40 has a pair of ears 42 (FIGS. 2 and 5) which provide a trunnion connection with tab 43 which has edges welded to vertical angle leg 23 and floor plate 21. A pin 44 extends through aligned apertures in tab 43 and ears 43 to complete the trunnion connection. A second trunnion connection is provided between piston 41 and deck 31. In this respect, spaced ears 45 are formed at the end of piston 41. A tab 46 has its upper edge welded to the underside 47 of tubular member 49 at 50 (FIG. 8). A pivot shaft 51 extends through aligned apertures in ears 45 and tab 46.

When hydraulic fluid is supplied to cylinder 40, the piston 41 will be moved outwardly from the position of FIG. 2 to the position of FIG. 3 to raise deck 31 from the position of FIG. 2 to the position of FIG. 3. During the raising action, a pair of hands 52 will pivot outwardly through slots 53 (FIG. 1) in deck 31 in a clockwise direction about pivot shaft 54 because of the existence of substantially parallel elongated links 55 (FIGS. 3 and 5) which have first ends pivotally mounted on shaft 56 which is pivotally secured relative to hands 52 and because the opposite ends of links 55 are pivotally mounted on shaft 57 (FIG. 5) which is supported by spaced plates 34. A spacer tube 56' encircles shaft 56 and has its opposite ends welded to the ends of links 55. A spacer tube 57' encircles shaft 57 and is located between plates 34. During the raising action of deck 31, plate 58, which is pivotally mounted at the outer end of deck 31, will slide along plate 48 located above plate 29 on wall 11. Plate 58 moves to the position of FIG. 3 to act as a deflector for material which might otherwise fall into the base 20.

As noted above, the deck 31 will rise until it engages the ICC bar 17, and simultaneously, hands 52 will pivot in a clockwise direction about shaft 54. When further pivotal movement of deck 31 is obstructed by ICC bar 17, the pressure within cylinder 40 will build up and a second hydraulic motor 59 will be actuated to move shaft 54 in a rectilinear direction parallel to the upper surface of deck 31. This will be accompanied by a further clockwise pivotal movement of hands 52 because of the connection provided by links 55 to the lower portion of hands 52 at shaft 56.

Hydraulic motor 59 includes a cylinder 60 and a piston 61. The rear end of cylinder 60 has a tube 62 (FIG. 4) secured thereto which receives shaft 36 which extends between tabs 37. The outer end of piston 61 is welded to sleeve 63 (FIGS. 4 and 8) which pivotally encircles shaft 54. The outer ends of shaft 54 mount elongated members 64 which are telescopically received within rectangular tubes 49 and 49', both of which have their upper sides welded to the underside of deck 31. Spacers 65 encircle shaft 54, are secured to elongated members 64, and are spaced between members 64 and hands 52. Thus, when piston 61 is forced out of cylinder 60, the upper portions of hands 52 will pivot in a clockwise direction about shaft 54 while shaft 54 is moving rectilinearly in a substantially parallel path relative to the underside of deck 31. Thus, hands 52 will exert a force biasing ICC bar 17 toward wall 11.

It can thus be seen that the ICC bar restraining device 10 both seeks out the height of ICC bar 17 and also adjusts for the distance between ICC bar 17 and wall 11, thereby being able to effectively operate with ICC bars which are located in various positions relative to wall 11 when the rear end of the truck is abutting pads 66 on wall 11. In an actual model built to scale from the drawings, the restraint device 10 is capable of operating effectively with an ICC bar 17 which is located between 14 inches and 32 inches above the ground and between 4 inches and 16 inches from the wall 11. It is to be further noted that since the base 11 is bolted to the ground, any force on the hand members 52 tending to pull them away from the wall 11 will be directed into the ground and not in such a direction as to primarily exert a pulling force on wall 11.

In FIG. 1 inclined side plates 67 are suitably mounted on side plates 22 of base 20. These plates 67 have been eliminated from the remainder of the figures except FIGS. 6 and 7. Plates 67 are merely to provide inclined surfaces for deflecting snow plows during wintertime.

Figure 9:
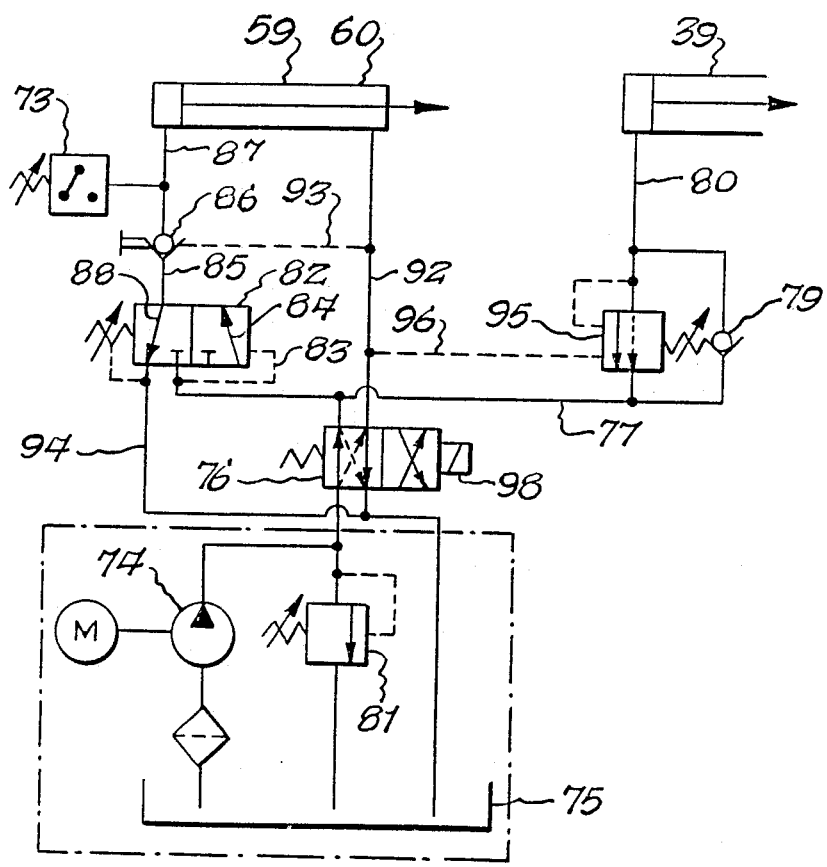
FIG. 9 is a schematic hydraulic diagram for operating the ICC bar restraining device.
Figure 13:
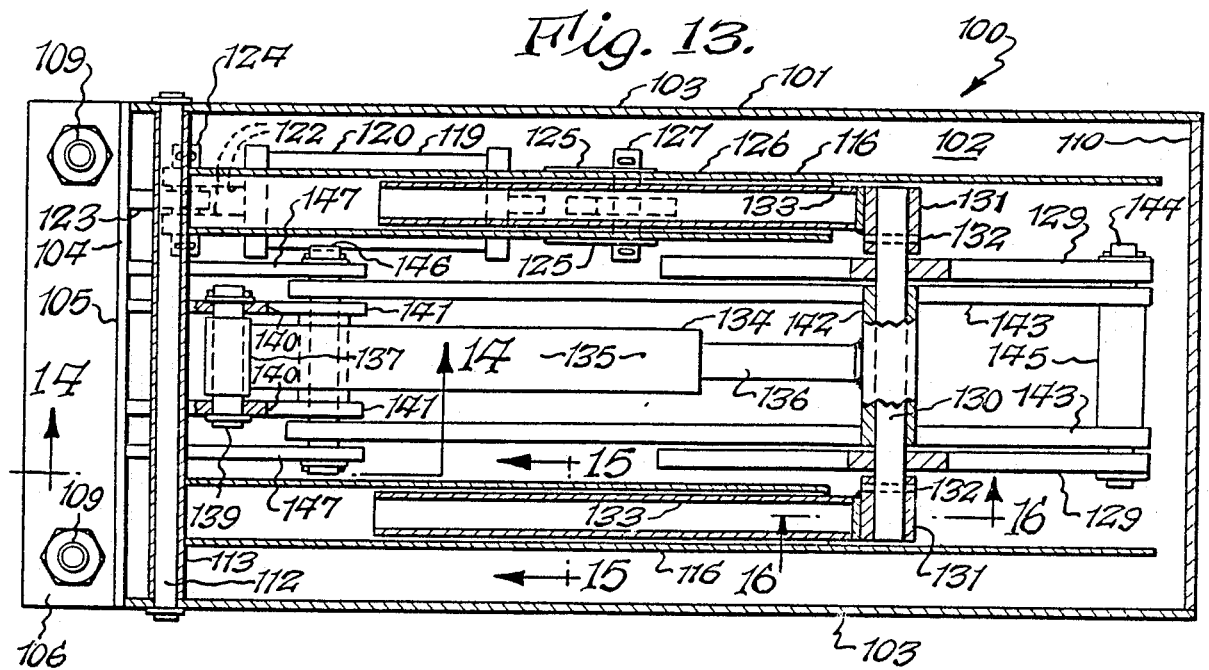
FIG. 13 is a cross sectional view taken along a line such as 4—4 of FIG. 2 and showing another embodiment of the present invention.
Figure 14:
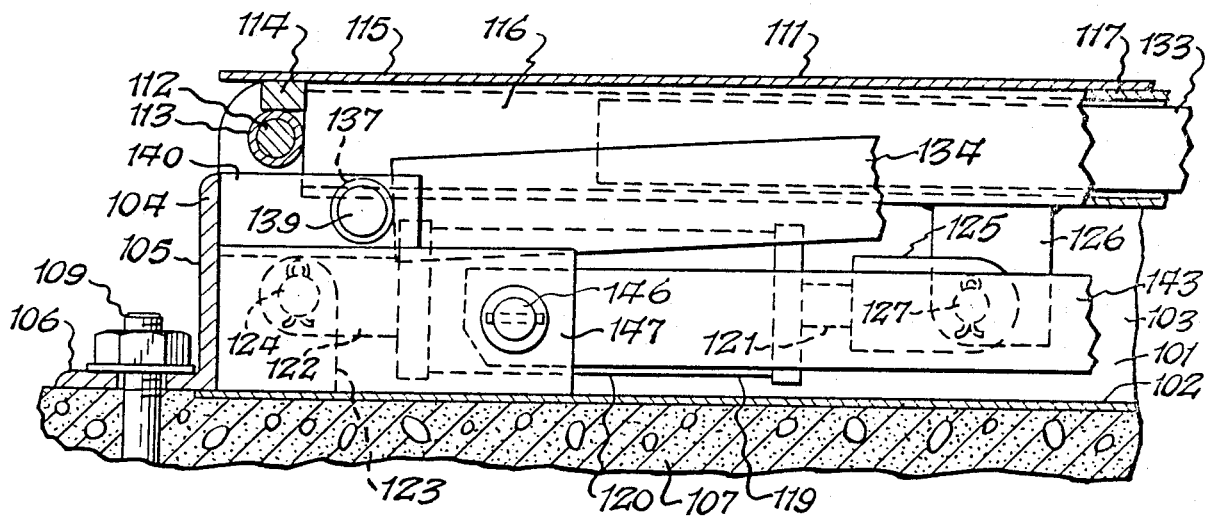
FIG. 14 is a fragmentary enlarged cross sectional view taken substantially along line 14—14 of FIG. 13.
Figure 15:
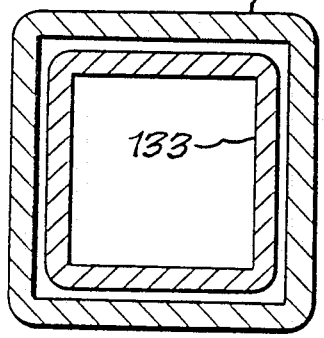
FIG. 15 is an enlarged cross sectional view taken substantially along line 15—15 of FIG. 13.
Figure 16:
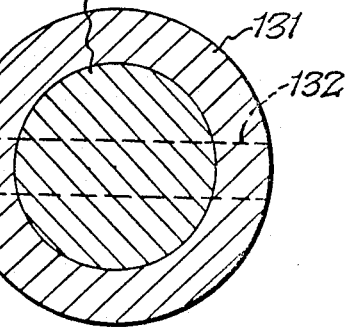
FIG. 16 is an enlarged cross sectional view taken substantially along line 16—16 of FIG. 13.

The ICC bar restraining structure described above operates in the following manner when the electro-hydraulic control system of FIGS. 9-12 is actuated. In this respect, the electrical control circuit includes a key switch 70 on the master control panel 71 which may be located within the building wall proximate doorway 12. When the key switch 70 (FIG. 12) is closed, the system is ready for operation. Normally the unit 10 occupies the fully retracted position shown in FIGS. 1 and 2. A truck is thus able to back up against pads 66. When it is in this position, the up button 72 is actuated. This will complete a circuit through relay R1 which in turn will cause contacts R1 to close, thus providing a holding action on relay R1. Also at this time transformer 68 and rectifier 78 are energized, and a circuit is completed through normally closed pressure switch 73 (FIG. 9) in its solid line position, normally closed relay contacts R4 and motor control relay MC. This will cause normally open motor control contacts MC to complete a circuit through motor M which drives pump 74 (FIG. 9). Thus hydraulic fluid will be pumped from sump 75 through valve 76 in the solid line position shown in FIG. 9, conduit 77, check valve 79, and conduit 80 into motor 39. This will raise deck 31 until it hits the underside of the ICC bar 17. The foregoing may occur at a pressure of between about 150-180 psi. Continued action of pump 74 will cause the hydraulic pressure in motor 39 to increase. During the foregoing action valve 81 is in the closed position shown in FIG. 9. As the pump 74 continues to operate, there will be a pressure build-up in conduit 77 which will cause valve 82 to shift because of the increased pressure in line 83. This pressure may be about 350 psi. Thus, hydraulic fluid will now be fed through conduit 84 in valve 82, conduit 85, check valve 86, and conduit 87 into hand actuating cylinder 60 which will pivot hands 52 in the above-described manner until they engage ICC bar 17. When the pressure in line 87 reaches a predetermined value, about 500 psi, pressure switch 73 (FIGS. 9 and 12) will be actuated to move to its dotted-line position in FIG. 12. This will open the circuit to motor control relay MC which will cause contacts MC to open which in turn will shut motor M to thereby terminate the pumping action of pump 74. Check valve 86 will remain closed so as to cause the motor 59 to remain pressurized and thus cause the restraint device 10 to continue holding the ICC bar. If for any reason there should be a loss of hydraulic pressure at pressure switch 73, it will return to the solid-line position of FIG. 12 to restart the motor M and thus continue the pumping action to cause motor 59 to again be supplied with pressurized fluid until the pressure switch again causes the motor M to shut off. This is possible because transformer 68 and rectifier 78 remain energized because relay contacts R1 remain closed.

As soon as the electrical circuit is energized in the above-described manner by closing the up switch 72, the red light R (FIGS. 10 and 12) is energized through its normally closed relay contacts R2. This is a warning that the ICC bar has not yet been engaged. After the ICC bar has been fully engaged, as described above when pressure switch 73 moves to its dotted-line position, a circuit will be completed through relay R2 which in turn will open normally closed contacts R2 to turn off the red light R. Furthermore, since pressure switch 73 is now in the dotted-line position, a circuit will be completed through the green light G to thereby provide information that the ICC bar has been properly engaged. Furthermore, the DON'T MOVE lights in the outdoor panel 90 are caused to flash as soon as the up button has been closed in response to the energization of transformer 68 and rectifier 78, and they will continue to flash all of the time that the truck is restrained by device 10. As can be seen from FIG. 11, the words DON'T MOVE are shown reading both forward and backward so that the driver of the truck in looking into his rear view mirror can read the DON'T MOVE sign.

When it is desired to return the ICC restraining bar unit 10 to its down position shown in FIGS. 1 and 2, the down switch 91 is closed to complete a circuit through normally closed timer relay switch TR, relay R3 and relay R5. The actuation of relay R3 will close normally open contacts R3 which are in series with timer relay TR which will in turn start a timer (not shown) operating for 6 to 10 seconds. The closing of relay contacts R3 in series with relay R3 will produce a holding action on relay R3. In addition, normally open relay contacts R3 in series with motor control relay MC will close to close relay contacts MC in series with motor M to thereby start motor M to drive the pump 74. The closing of contacts R3 in series with relay R3 will also maintain a circuit to solenoid 98 to shift valve 76 to the dotted line position. In addition, the actuation of relay R5 will close normally open contacts R5 which energize relay R1 to close normally open contacts R1 to maintain relay R1 energized and also maintain transformer 68 and rectifier 78 energized after switch 91 is released. As noted above, valve 76 (FIG. 9) has shifted to shift to its dotted-line position, and thus high pressure fluid will be pumped through valve 76 into conduit 92 to cause the piston 61 in cylinder 60 to retract. Furthermore, the high pressure fluid in line 92 will be sensed at check valve 86 through conduit 93 to thus open check valve 86 to permit the fluid on the opposite side of the piston in cylinder 60 to flow through conduit 87, now open check valve 86, conduit 85, conduit 88 in valve 82 and conduit 94 to the sump 75. Simultaneously, the weight of deck 31 will force the piston 41 in cylinder 39 to retract, thus forcing hydraulic fluid into conduit 80 and through valve 95 which is now in its dotted-line position because high pressure is applied to it through conduit 96. The hydraulic fluid from conduit 80 will thus pass into conduit 77 from which it flows to the sump through valve 76 which is now in its dotted-line position.

While the foregoing is occurring, the pressure switch 73 is in its solid-line position in FIG. 12 to maintain the circuit energized through the motor control relay MC. This circuit is also maintained through now closed contacts R3 in series with the motor control relay. However, since switch 73 is in the solid-line position, the green light G will be off and the red light R will be on because relay contacts R2 are closed. As noted above, the red light indicates that the system is in operation. Furthermore, the DON'T MOVE sign will still be flashing because the transformer is in operation. When the timer circuit TR times out, timer switch TR will open to terminate the flow of current to the remainder of the circuit and the timer motor will stop and the pump motor M will also stop.

In addition to the foregoing, a normally open limit switch 97 is provided in series with relay R4. In the event that the deck 31 should move upwardly to the limit of its travel and not contact an ICC bar, limit switch 97 will close to actuate relay R4 which in turn closes normally open contacts R4 in series with the horn, and since relay contacts R1 are closed to energize transformer 68, the horn will sound to provide an alert to the effect that the ICC bar is not engaged. In addition, the normally closed contacts R4 in series with motor control relay MC will open to terminate energization of the latter to open motor relay contacts MC to shut off motor M. Thus, the only way that unit 10 can now be energized is by actuating the down switch 91.

Pressure relief valve 81 will open at about 550 psi in the event pressure in the system should reach this value. Furthermore, if the pressure on the deck 31 causes the pressure in motor 39 to exceed 150–180 psi, valve 95 will open, that is, move to its dotted line position.

Another embodiment of the present invention is disclosed in FIGS. 13–16. This embodiment differs from the embodiment of FIGS. 1–12 only in the mechanical aspects which are shown. The electrical controls and hydraulic circuits are identical to the embodiment of FIGS. 1–12.

The ICC restraint device 100 includes a base 101 having a bottom plate 102 to which the lower edges of side plates 103 are secured, as by welding. An angle 104, which is analogous to angle 23, has a vertical leg 105, the opposite end portions of which are secured, as by welding, to adjacent edges of side plates 103. The horizontal leg 106 of angle 104 is secured to roadway 107 by suitable bolts 109. A plate 110, which is analogous to plate 29, has its opposite edges secured, as by welding, to adjacent portions of side plates 103.

A deck 111 is pivotally secured to side plates 103 by shaft 112, the opposite ends of which are journalled in suitable apertures (not numbered) in side plates 103. A tubular member 113 is welded to the underside of elongated block 114 which has its upper side welded to the underside of deck plate 115 and has one of its vertical sides abutting the ends of rectangular tubes 116 which have their top sides 117 welded to the underside of deck plate 115.

A deck raising motor 119, which is analogous to motor 39 of FIGS. 1–12, includes a cylinder 120 and a piston 121. The cylinder includes a pair of spaced ears 122 which are located on opposite sides of tab 123 which has its lowermost side secured, as by welding, to bottom plate 102 and one of its vertical sides secured, as by welding, to the vertical leg of angle 104. A pin 124 extends through aligned apertures in ears 122 and tab 123 to provide a trunnion connection at the end of cylinder 120. A pair of ears 125, which are analogous to ears 45 of FIGS. 2 and 8, are secured to the end of piston rod 121 and they bracket tab 126 which has its uppermost side secured, as by welding, to the underside of one of the two rectangular tubes 116. A pin 127 extends through aligned apertures (not shown) in ears 125 and tab 126 to provide a pivotal connection therebetween. As with the other embodiment, as pressurized fluid is admitted to cylinder 120, piston 121 will be moved out of cylinder 120 to cause deck 101 to pivot about the axis of shaft 112.

A pair of hands 129, which may be identical in side elevational configuration to hands 52 of the preceding figures, have their central portions pivotally mounted on shaft 130. Sleeves 131 are suitably secured, as by pins 132, to the opposite end portions of shaft 130. Sleeves 131 in turn are welded to the ends of rectangular tubular members 133 which are slidably mounted within tubular members 116.

In order to pivot hands 129 in the same manner as described above relative to hands 52, a motor 134 is provided which consists of cylinder 135 and piston 136. A tubular member 137 is secured, as by welding, to the end of cylinder 134 and it pivotally receives a shaft 139, the opposite ends of which are mounted in tabs 140 which have vertical sides secured, as by welding, to the vertical leg 105 of angle 104 and which have their lowermost sides secured, as by welding, to elongated plates 141 which, in turn, have their lowermost sides welded to bottom plate 102 and which have one of their vertical sides welded to vertical leg 105 of angle 104. The outermost end of piston 136 is welded to sleeve 142 which pivotally encircles shaft 130 on which hands 129 are pivotally mounted.

A pair of substantially parallel elongated rods 143 are analogous to elongated rods 55 of the preceding figures. First ends of elongated rods 143 are pivotally mounted on shaft 144 which is analogous to shaft 56 of the preceding figures. A sleeve 145 encircles shaft 144 to space rods 143. The lowermost portions of hands 129 are also pivotally mounted on shaft 144 in a manner which is analogous to that disclosed above in FIG. 8 relative to hands 52. The opposite ends of elongated members 143 are pivotally mounted on shaft 146 which not only extends through suitable aligned apertures in tabs 141 but also extends through aligned apertures in tabs 147 which have their lowermost sides secured, as by welding, to bottom plate 102 and which have vertical sides secured, as by welding, to the vertical leg 105 of angle 104. As can be seen from FIG. 13, the two tabs 141 and the two tabs 147 are substantially parallel to each other, and the ends of rods 143 are located between each pair of tabs 141–147.

As noted briefly above, the basic difference between the specific structure described above in FIGS. 13–16 and the structure of FIGS. 1–12 resides in the described mechanical differences. Otherwise the two embodiments are substantially similar and the hydraulic and electrical circuits are identical.

It can thus be seen that the improved ICC bar restraining system of the present invention is manifestly capable of achieving the above-enumerated objects, and while preferred embodiments of the present invention have been disclosed, it will be appreciated that it is not limited thereto but may be otherwise embodied within the scope of the following claims.

What is claimed is:

1. A restraint device for restraining a vehicle having an ICC bar relative to a wall comprising a base, a raisable member, securing means movably securing said raisable member to said base, hand means mounted on said raisable member for movement therewith for engaging said ICC bar, and motor means for raising said raisable member into a raised position and for causing said hand means to engage said ICC bar with a biasing force toward said wall after said raisable member has been raised to said raised position, said motor means comprising a first motor for raising said raisable member, and a second motor for causing said hand means to engage said ICC bar with said biasing force, said base including a first portion proximate said wall and a second portion remote from said wall, said securing means comprising a pivotal connection between said base and said raisable member proximate said second portion, said first motor means comprising an hydraulic motor coupled between said base and said raisable member, said second motor means comprising a second hydraulic motor mounted relative to said raisable member, said hand means comprising lever means having lower and upper opposite end portions and a central portion therebetween, pivot means located at said central portion for pivotally mounting said hand means on said raisable member, and elongated link means coupled between said base and said lower end portion for causing said hand means to pivot about said pivot means when said raisable member is raised to thereby move said upper portion in a direction upwardly from said raisable member.

2. A restraint device as set forth in claim 1 including mounting means mounting said pivot means for rectilinear movement on said raisable member, and wherein said second motor means effects said rectilinear movement of said pivot means while said elongated link means restrains said lower end portion to thereby cause said upper portion to produce a combined rotational and translational movement for contacting said ICC bar.

3. A restraint device as set forth in claim 2 wherein said mounting means comprises sliding means on said pivot means, and track means on said raisable member for guiding said sliding means.

4. A restraint device as set forth in claim 3 wherein said pivot means comprises a shaft having end portions, and wherein said sliding means comprise an elongated member at each of said opposite end portions of said bar, and wherein said track means comprise an elongated track member at each end of said shaft containing one of said elongated members.

5. A restraint device as set forth in claim 4 wherein said hand means comprise a pair of hand-like members spacedly mounted on said shaft.

6. A restraint device as set forth in claim 5 wherein said second hydraulic motor comprises a cylinder and piston, and wherein said piston includes an outer end for abutting said shaft between said hand-like members.

7. A restraint device for restraining a vehicle having an ICC bar relative to a wall comprising a base, a raisable member, securing means movably securing said raisable member to said base, hand means mounted on said raisable member for movement therewith for engaging said ICC bar, and motor means for raising said raisable member into a raised position and for causing said hand means to engage said ICC bar with a biasing force toward said wall after said raisable member has been raised to said raised position, said hand means comprising lever means having lower and upper opposite end portions and a central portion therebetween, pivot means located at said central portion for pivotally mounting said hand means on said raisable member, and elongated link means coupled between said base and said lower end portion for pivoting said hand means about said pivot means as said raisable member is raised.

8. A restraint device as set forth in claim 7 including mounting means mounting said pivot means for rectilinear movement on said raisable member, and wherein said motor means effects said rectilinear movement of said pivot means while said elongated link means restrains said lower end portion to thereby cause said upper portion to produce a combined rotational and translational movement for contacting said ICC bar.

9. A restraint device as set forth in claim 8 wherein said mounting means comprises elongated means on said pivot means, and track means on said raisable member for guiding said elongated means during said translational movement.

10. A restraint device as set forth in claim 9 wherein said pivot means comprises an elongated shaft having opposite ends, and wherein said elongated means comprise an elongated rod-like member at each opposite end of said elongated shaft, and wherein said track means comprise a pair of spaced elongated tubular members each containing one of said elongated rod-like members.

11. A restraint device for restraining a vehicle having an ICC bar relative to a wall comprising a base, a raisable member, securing means movably securing said raisable member to said base, hand means mounted on said raisable member for movement therewith for engaging said ICC bar, and motor means for raising said raisable member into a raised position and for causing said hand means to engage said ICC bar with a biasing force toward said wall after said raisable member has been raised to said raised position, said motor means comprising a first fluid motor effectively coupled between said base and said raisable member, a second fluid motor coupled to said hand means, and a control circuit for actuating said first and second fluid motors comprising an electric motor, a pump coupled to said electric motor, first electric circuit means for actuating said motor to drive said pump, first fluid circuit means for conducting fluid to said first fluid motor to raise said raisable member, second fluid circuit means for conducting fluid to said second fluid motor to actuate said hand means to cause them to engage said ICC bar with said biasing force when the pressure of fluid supplied to said first fluid motor reaches a predetermined value, third fluid circuit means for conducting fluid to said second fluid motor to move said hand means away from said ICC bar to thereby release said biasing force on said ICC bar, fourth fluid circuit means for conducting fluid circuit means for conducting fluid away from said first fluid motor to permit lowering of said raisable member, said first and third fluid circuit means including valve means shiftable between a first position to actuate said first fluid circuit means to cause said first fluid motor to raise said raisable member and a second position for actuating said second fluid circuit means to cause said second fluid circuit to cause said second fluid motor to cause said hand means to release said biasing force on said ICC bar, said first fluid circuit means also including first check valve means for preventing back-flow of fluid from said first fluid motor when said raisable member is in said raised position, and said second fluid circuit means including second check valve means for preventing back-flow from said second fluid motor when said second fluid motor causes said hand means to exert said biasing force on said ICC bar.

12. A restraint device as set forth in claim 11 wherein said third fluid circuit means includes fifth circuit means for deactivating said second check valve means to permit back flow therethrough and wherein said fourth circuit means includes sixth circuit means for effectively bypassing said first check valve means to permit fluid away from said first hydraulic motor.

* * * * *